United States Patent
Stutz (10) Patent No.: US 8,350,206 B2
(45) Date of Patent: Jan. 8, 2013

(54) TRANSIMPEDANCE AMPLIFIER CIRCUIT FOR CONVERTING AN INPUT CURRENT TO AN OUTPUT VOLTAGE SUCH CIRCUITS USED FOR THE EVALUATION OF OUTPUT SIGNALS OF PHOTO DETECTORS, WHICH ARE GENERATING A CURRENT THAT IS PROPORTIONAL TO THE INTENSITY OF RECEIVED LIGHT

(75) Inventor: Reto Stutz, Berneck (CH)

(73) Assignee: Leica Geosystems AG, Heerbrugg (CH)

( * ) Notice: Subject to any disclaimer, the term of this patent is extended or adjusted under 35 U.S.C. 154(b) by 440 days.

(21) Appl. No.: 12/673,631

(22) PCT Filed: Aug. 14, 2008

(86) PCT No.: PCT/EP2008/060707
§ 371 (c)(1),
(2), (4) Date: Feb. 16, 2010

(87) PCT Pub. No.: WO2009/024536
PCT Pub. Date: Feb. 26, 2009

(65) Prior Publication Data
US 2011/0017904 A1    Jan. 27, 2011

(30) Foreign Application Priority Data

Aug. 17, 2007  (EP) ..................................... 07114572

(51) Int. Cl.
*H03F 3/08* (2006.01)
(52) U.S. Cl. ...................... 250/214 A; 250/208.1; 330/7
(58) Field of Classification Search ............... 250/208.1, 250/208.2, 214.1, 214 R, 214 A, 214 DC; 330/7, 67; 327/61, 111, 337, 390, 554
See application file for complete search history.

(56) References Cited

U.S. PATENT DOCUMENTS 4,535,233 A    8/1985    Abraham
(Continued)

FOREIGN PATENT DOCUMENTS

EP    0 720 311 A2    7/1996
(Continued)

OTHER PUBLICATIONS

Jerald Graeme "Photodiode Amplifiers OP Amp Solutions" McGraw-Hill, United States, 1996 pp. 21-30.
(Continued)

*Primary Examiner* — Francis M Legasse, Jr.
(74) *Attorney, Agent, or Firm* — Maschoff Gilmore & Israelsen (57) ABSTRACT

The invention relates to a transimpedance amplifier circuit for converting an input current into an output voltage $U_{out}$, comprising an amplifier element (4) having at least one signal input and an output having the output voltage $U_{out}$. For this purpose, the transimpedance amplifier circuit has a T-shaped feedback network divided into at least a first branch (1), a second branch (2) and a third branch (3), which is connected in series with the first branch (1), thus producing a node (K). The first branch (1) has a non-reactive resistance (R1) and is connected to the output at one end and the node (K) at the other end. The second branch (2) has at least one capacitance $C_2$ and is connected to the node (K) at one end and in particular to an earth at the other end, and the third branch (3) has at least one capacitance $C_3$ and is connected to the node (K) at one end and to the signal input at the other end. As a result, a capacitive current division is effected at the node (K).

22 Claims, 6 Drawing Sheets

U.S. PATENT DOCUMENTS

| | | | | |
|---|---|---|---|---|
| 4,719,408 A | * | 1/1988 | Carlton | 324/618 |
| 5,455,705 A | | 10/1995 | Gusinov | |
| 8,049,155 B2 | * | 11/2011 | Weigen | 250/214 R |

FOREIGN PATENT DOCUMENTS

| | | | |
|---|---|---|---|
| WO | 02/46779 A1 | | 6/2002 |
| WO | WO 2007122475 A1 | * | 11/2007 |

OTHER PUBLICATIONS

Third party observations of Nov. 23, 2011 in related European Patent Application No. 08787237.0 mailed Jul. 9, 2012.

\* cited by examiner

TRANSIMPEDANCE AMPLIFIER CIRCUIT FOR CONVERTING AN INPUT CURRENT TO AN OUTPUT VOLTAGE SUCH CIRCUITS USED FOR THE EVALUTATION OF OUTPUT SIGNALS OF PHOTO DETECTORS, WHICH ARE GENERATING A CURRENT THAT IS PROPORTIONAL TO THE INTENSITY OF RECEIVED LIGHT

The invention relates to a Transimpedance amplifier circuit for converting an input current into an output voltage and a photodetector.

BACKGROUND

Transimpedance amplifier circuits, also referred to as current-voltage convertors or I-U convertors, are used in many areas—such as, for example, for photodetectors—for permitting precise measurements of small currents. Ideally, these amplifier circuits convert an input current into an output voltage proportional thereto. The ratio of output voltage $U_{out}$ to input current $I_{in}$ is designated as transimpedance $Z_{EQ}=U_{out}/I_{in}$ since the effect corresponds to an impedance.

A known possible design of a transimpedance amplifier is realized by one or more amplifier elements and a feedback branch. For example, operational amplifiers are used as amplifier elements, a customary basic operational amplifier circuit representing a transimpedance amplifier circuit. In the case of this basic circuit, the non-inverting input of an operational amplifier is connected to ground, and an input current signal is present at the inverting input of the operational amplifier. The operational amplifier is coupled with negative feedback to an ohmic resistance which determines the amplification factor. Ideally, the transimpedance ZEQ consists only of the ohmic resistance ZEQ=R and the amplification factor of the operational amplifier is infinite. In the case of the ideal transimpedance amplifier, it is remarkable that its function is frequency-independent. The signal current Iin at the input and the signal voltage Uout at the output could then have any desired frequency, so that, for example, information from a CD scanned via laser could be read out with very high frequencies and therefore very rapidly.

In the case of the real transimpedance amplifier, on the other hand, some non-ideally functioning factors have to be taken into account. For example, the ohmic feedback resistance has a parasitic self-capacitance which can be considered as a capacitance connected in parallel. This parallel capacitance limits the frequency bandwidth of the feedback resistance and hence that of the transimpedance amplifier.

Furthermore, photodiodes, avalanche photodiodes (APD) or CMOS sensors serving as a current source have a parasitic capacitance, in particular large-area APDs having a very high parasitic capacitance $C_{in}$. As a result of this capacitance $C_{in}$, no high bandwidths are permitted. The bandwidth BW is obtained as follows:

$$BW = \frac{1}{(2\pi C_{in} R_{EQ}/A)},$$

in which $R_{EQ}$ represents the transimpedance, A represents the linear amplification of the amplifier element and therefore $R_{EQ}/A$ represents the input impedance of the transimpedance amplifier.

In addition, the real transimpedance amplifier also has a further, non-ideally functioning element—the amplifier element—such as, for example, the operational amplifier—itself. Thus, the real amplification, which is described by the ratio of the output to the input voltage, is not infinitely high, as is assumed in the case of the ideal transimpedance amplifier. Furthermore, the limited bandwidth of the amplifier element constitutes one of the main limits of a transimpedance amplifier.

The problem of the real transimpedance amplifier is therefore that its function is frequency-dependent. However, it would be desirable for it to operate in a frequency-independent manner in order to avoid distorting the information. However, this is possible in reality only in a limited frequency interval, a higher bandwidth which is antiproportionally dependent on the resistance value and on the parallel capacitance and in which the transimpedance amplifier operates in an approximately frequency-independent manner being realizable by smaller feedback resistances.

However, smaller feedback resistances result in a higher current noise $I_{noise}$, which depends on the resistance value as follows:

$$I_{noise} = \sqrt{\frac{4kT}{R_f}}$$

in which $R_f$ represents the feedback resistance, T represents the absolute temperature and k represents the Boltzmann constant. The current noise due to the feedback resistance is disadvantageous since it is superposed on the input current which is generated, for example, by a photodiode and is to be actually converted by the transimpedance amplifier into a readily measurable output voltage and cannot differ therefrom.

It is true that a small current noise could now be achieved by the choice of a high feedback resistance. However, a high feedback resistance results—as mentioned above—in a relatively small bandwidth in which the transimpedance amplifier has the desired frequency-independent properties. Thus, it is desirable to make a so-called bandwidth-versus-noise compromise which is as optimal as possible.

For example, it is known that the feedback resistance can be replaced by a plurality of resistances which are connected in series. However, this technique is fairly quickly limited by the parallel capacitances to earth and the resulting length of the resistance chain.

The prior art also discloses the replacement of the feedback resistance by a feedback network, in particular a T-shaped network, which is composed, for example, exclusively of resistances. T-shaped feedback networks having exclusively capacitive components are also known, which is disclosed, for example, in the laid-open application WO 02/46779 A1. An overview of amplifier circuits of the prior art is also provided in "Photodiode Amplifiers" by Jerald G. Graeme, McGraw-Hill Publishers, USA 1996, pages 21 to 30.

The laid-open application U.S. Pat. No. 5,455,705 describes a transimpedance amplifier for an optical receiver having a photodetector generating a current and an integrating member for receiving the current, the integrating member having a capacitor. The output of the integrating member is connected to an amplifier stage which is formed for providing a voltage dependent on the output of the integrating member. A feedback resistance is connected between the output of the amplifier stage and the input of the integrating member and therefore determines both the nominal amplification and—in combination with the capacitor—the bandwidth of the transimpedance amplifier. For increasing the bandwidth, it is proposed to increase the amplification factor of the amplifier stage, in particular the amplification factor being made to be adjustable by a variable resistance in the amplifier stage. However, a current noise is not taken into account in this laid-open application.

Furthermore, it is known that transimpedance amplifiers having high transimpedance generate output signals with high amplitudes which may prove to be disadvantageous. In addition, high transimpedances require high open-circuit gains of the amplifier element.

A transimpedance amplifier circuit having a broad frequency band and a low noise and having a relatively low transimpedance $R_{EQ}$, in particular having a current noise of $I_{noise} <$ root $(4kT/R_{EQ})$ dependent on the transimpedance, is therefore desirable.

Particularly in the case of transimpedance amplifier circuits which are used in photodetectors for laser rangefinders, non-distorting and low-noise conversion into a measurable output voltage is desirable for different and in particular relatively high frequencies of an input current generated by a photosensitive receiving element.

SUMMARY

An object of the invention is therefore the provision of an improved transimpedance amplifier circuit.

A further object of the invention is the provision of a transimpedance amplifier circuit having little complexity and having low current noise in combination with a relatively low transimpedance and/or a relatively broad frequency interval in which an input current can be converted in an approximately frequency-dependent manner into a measurable output voltage.

A further object is the provision of a photodetector, in particular for laser rangefinders according to the phase measurement or pulse transit time principle, a current signal generated by a photosensitive receiving element as a function of the irradiation thereof being converted in an improved manner for different and in particular for relatively high frequencies, and with little effort and switching technology of low complexity, into an output voltage measurable as a function thereof.

These objects are achieved by realizing the characterizing features of the independent claims. Features which further develop the invention in an alternative or advantageous manner are evident from the dependent patent claims.

A transimpedance amplifier circuit according to the invention for converting an input current into an output voltage $U_{out}$ is designed with an amplifier element with signal input and output and a T-shaped feedback network.

The T-shaped feedback network has a first, a second and a third branch, which in each case are connected towards one end with a node K. The first branch, which is connected at the other end to the output of the amplifier element, has a feedback resistance $R_1$. This feedback resistance $R_1$ results in a current noise $I_{noise}$, which is given by $$I_{noise,R_1} = \sqrt{\frac{4kT}{R_1}}$$

T representing the absolute temperature and k representing the Boltzmann constant.

According to the invention, the current $I_{R1}$ now flowing through the feedback resistance is capacitively divided at the node K so that only a part of this current—and hence also only a part of the noise current—is fed back to the input of the amplifier element. For example, an amplifier circuit having lower noise—considered as a ratio to the transimpedance of the circuit—can now be realized by this current division.

For this purpose, the second branch of the T-shaped feedback network has at least one capacitive component $C_2$ and the third branch, which leads to the signal input of the amplifier element, has at least one capacitive component $C_3$.

In particular, a feedback resistance $R_1$ having a low resistance value can now be used, so that the parasitic parallel capacitance $C_{R1}$ thereof acts in a less limiting manner at higher frequencies and therefore higher bandwidths, in particular for high frequencies, are achievable. The higher current noise caused by a low resistance value of $R_1$ can be compensated or even overcompensated by the capacitive current division so that a lower noise than should actually be given by the transimpedance, namely root $(4kT/R_{EQ})$, is achievable as input current noise $I_{noise}$.

However, the advantages achievable by the capacitive current division according to the invention at the node K are realized only by a compromise. Thus, according to the invention a higher current flows from the amplifier element into the feedback network in a transimpedance amplifier circuit if a resistance $R_1$ having a low resistance value is used. Particularly in the case of transimpedance amplifiers for photodetectors of rangefinders, however, this does not present a problem. In addition, the properties permitted according to the invention, namely a high bandwidth, in particular for relatively high frequencies, and a low noise, are advantageous precisely in the area of photodetectors of rangefinders.

For example, the third branch has a resistance $R_3$, the parallel capacitance $C_{R3}$ thereof functioning at least proportionately as capacitance $C_3$. In addition, the third branch may have a capacitor having a capacitance $C_{K3}$, which is connected parallel to the distance $R_3$, so that $C_3 = C_{K3} + C_{R3}$ results as capacitance $C_3$ of the third branch.

Depending on the choice of the components used, in particular of the capacitances $C_2$ and $C_3$, of the resistances $R_1$ and $R_3$ and of the further components which are usually used for practical realization of a transimpedance amplifier circuit, a transimpedance amplifier can now be designed according to the desired properties.

In particular, the amplification factor curve of the circuit according to the invention, which is dependent on the frequency and is determined by the transimpedance, has two poles at the frequency $f_L$ and $f_H$, a substantially constant amplification factor existing in the frequency range between the frequencies $f_L$ and $f_H$ and hence the transimpedance amplifier operating as desired in this frequency range.

For example, by varying the resistance $R_3$ for frequencies less than $f_L$, the amplification factor curve can be adapted, the input noise considered in relation to the transimpedance $R_{EQ}$ also changing in each case.

Figure 2:
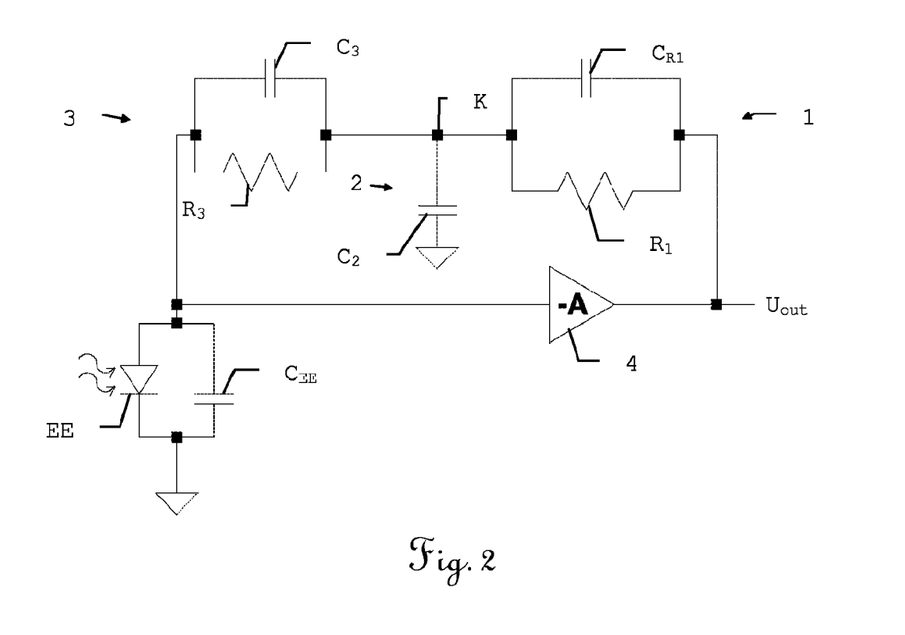
FIG. 2 shows a first embodiment of a transimpedance amplifier circuit according to the invention.
Figure 3:
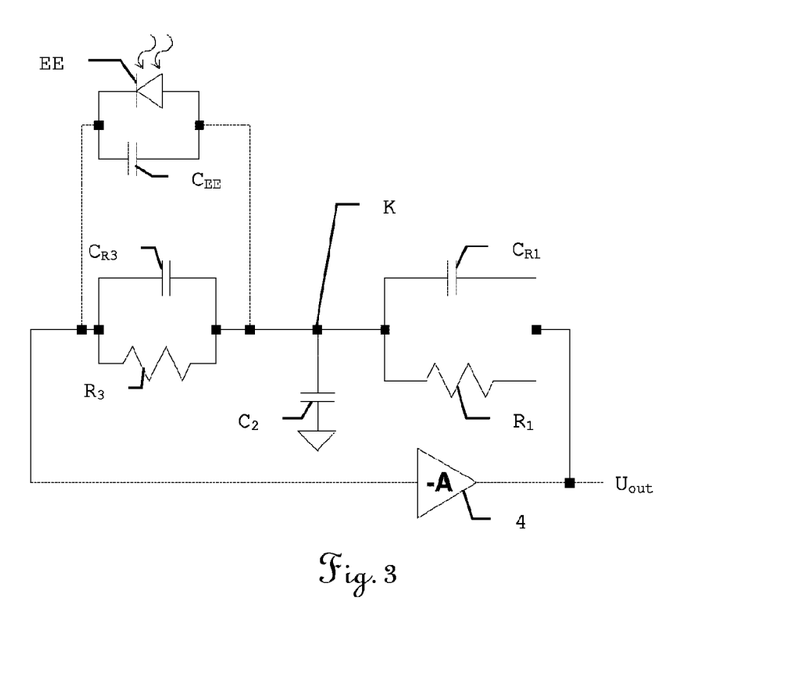
FIG. 3 shows a second embodiment of a transimpedance amplifier circuit according to the invention.

FIGS. 2 and 3 show in more detail by way of example an embodiment according to the invention which is designed with a resistance $R_3$ connected in parallel in the third branch of the feedback network. For example, it is possible to realize a bandwidth which is higher in relation to the input current noise. Furthermore, a specific embodiment—without resistance in the third branch of the feedback network—is illustrated in more detail in FIGS. 5 and 6 and explained in the associated description, a relatively low current noise being realizable.

BRIEF DESCRIPTION OF THE DRAWINGS

This object of the invention is described in more detail by way of example below with reference to specific working examples shown schematically and purely in principle in the figures, further advantages of the invention also being discussed. Specifically.

DETAILED DESCRIPTION

Figure 1:
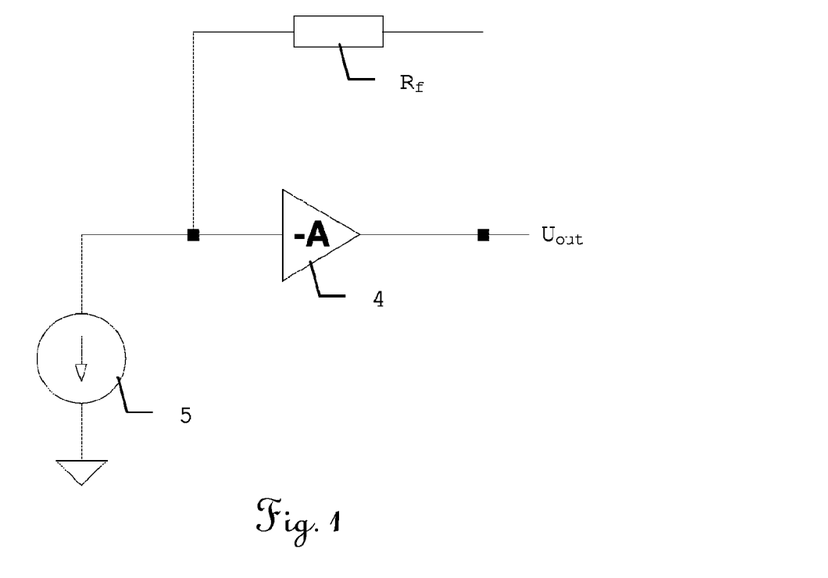
FIG. 1 shows a basic transimpedance amplifier circuit according to the prior art.

FIG. 1 shows a customary transimpedance amplifier circuit known according to the prior art and having an amplifier element 4 and a feedback resistance $R_f$. An input current signal generated by a current source 5 is converted by means of the circuit into a measurable output voltage $U_{out}$.

The ratio of output voltage $U_{out}$ to input current $I_{in}$ is designated as transimpedance Z where $Z=U_{out}/I_{in}$, since it acts like an impedance.

Considered ideally, the transimpedance $Z_{EQ}$ of this circuit consists only of the ohmic feedback resistance $Z_{EQ}=R_f$ and is independent of the frequency.

In reality, however, the feedback resistance has, for example, a parasitic parallel capacitance, resulting in the disadvantages already discussed at the outset in the description of the prior art.

In the case of this circuit, the current input noise $I_{noise}$ is:

$$I_{noise} = \sqrt{\frac{4kT}{R_f}}.$$

Since the noise decreases with increasing resistance $R_f$, a high feedback resistance would have to be chosen in order to obtain a low noise. However, higher-ohmic resistances permit smaller bandwidths—owing to their parallel capacitances.

Furthermore, high voltage amplitudes, which prove to be disadvantageous in some applications, also result in the case of transimpedance amplifiers with a high feedback resistance and hence high transimpedance.

FIG. 2 describes a first embodiment of a transimpedance amplifier according to the invention, having—in relation to the transimpedance and to the input noise—a broad frequency interval in which the transimpedance is approximately constant.

The transimpedance amplifier circuit shown converts a current generated by a photosensitive receiving element EE into an output voltage $U_{out}$ linked therewith.

For this purpose, the transimpedance amplifier circuit has an amplifier element 4 and a T-shaped feedback network having three branches which are connected to a node K. The first branch 1 of the feedback network is designed with a feedback resistance R1 with the parallel capacitance CR1 and is connected to the output of the amplifier element 4. The second branch 2 had a capacitor C2 and is connected to ground. The third branch 3 has a resistance R3 and a capacitance C3 parallel thereto.

The capacitance $C_3$ may be provided, for example, by a parallel capacitance $C_{R3}$ of the resistance $R_3$. However, a capacitor having a capacitance $C_{K3}$ can additionally be connected parallel to the resistance so that the resulting capacitance $C_3$ in the third branch is $C_3=C_{K3}+C_{R3}$.

By varying the resistance $R_3$, the amplification factor curve can be adapted for frequencies less than $f_L$, where $f_L$ may be, for example, 10 MHz, the input noise considered in relation to the transit beams $R_{EQ}$ also changing in each case.

In particular, the resistances $R_1$ and $R_3$ and the capacitances $C_2$ and $C_3$ can be chosen so that the following is true:

$$\frac{R_1}{R_3} = \frac{C_3}{C_2},$$

in which $R_1$ can be chosen with a correspondingly small resistance value so that no limitation at higher frequencies results from its parallel capacitance and hence a decrease in the amplification up to a frequency $f_H$, for example 100 MHz, can be prolonged. For $R_1/R_3=C_3/C_2$, the amplification factor curve is still constant even for frequencies less than $f_L$, so that an approximately constant amplification of an input current can then be realized with this circuit for all frequencies up to $f_H$.

A current input noise $I_{noise}$ caused by the resistances is as follows:

$$I_{noise} = \sqrt{\frac{4kT}{R_1 + R_3}}.$$

This current input noise caused by the resistances $R_1$ and $R_3$ is equal to the current input noise which would result from an equivalent circuit of the prior art according to FIG. 1—but at a higher frequency bandwidth which is permitted according to the invention and in which the desired constant conversion of an input current into an output voltage can be achieved.

Depending on requirements with regard to the circuit, however, the resistance $R_3$ can also be chosen to be lower or higher than $R_1 \cdot C_2/C_3$, so that the amplification factor for frequencies less than $f_L$ decreases or increases correspondingly. Likewise, the current input noise is correspondingly increased in one case and reduced in another case.

The amplification factor curve VF as a function of frequency f is shown for these three cases—$R_1/R_3=C_3/C_2$; $R_3<R_1 \cdot C_2/C_3$ and $R_3>R_1 \cdot C_2/C_3$—in a diagram in FIG. 4.

By means of this circuit arrangement, it is now possible to ensure that the parasitic parallel capacitance $C_{R1}$ of the resistance $R_1$ no longer has a limiting effect and hence a higher bandwidth—in particular for high frequencies—as in the case of the circuit shown in FIG. 1—considered in relation to the input noise—can be realized.

The advantages achievable by the invention are, however, permitted by a current which is higher—in comparison with solutions of the prior art—and which flows from the amplifier element 4 into the feedback network, which however presents no problem for many applications.

Depending on the field of use of the circuit, the person skilled in the art can design and configure it appropriately.

Thus, the circuit arrangement having different amplifier elements 4 can be realized. For example, operational amplifiers, discrete amplifiers or other amplifier elements known according to the prior art can be used. In particular, high electron mobility transistors (HEMT), which have particularly low noise, can be used as input transistors of the amplifier core.

The transimpedance amplifier circuit shown may be discrete or integrated. In addition, coupling capacitors can be installed at various points in a practical realization.

Instead of ground to which, for example, the second branch is connected, another reference potential which is constant for alternating current signals may also be present.

For example, since the first and second branch have a relatively low impedance, an analogue switch can additionally be used in order to increase the capacitance and hence to make the transimpedance variable.

Furthermore, the resistances $R_1$ and $R_3$ could also be realized by transistors.

The photosensitive receiving element EE which, for example, may be in the form of a photodiode, avalanche photodiode (APD), phototransistor, line or area arrangement of APDs or arrangement of CMOS sensors has a parallel self-capacitance CEE and is connected so that the current signal generated is fed to the signal input of the amplifier element 4. Depending on the receiving EE used, this may, as shown in FIG. 3, be connected either to ground or to a high voltage which is short-circuited, for example, to ground with a capacitor, such as, for example, with the use of an APD. These two different modes, namely with or without application of a high voltage, are known to the person skilled in the art and in general are to be calculated slightly differently.

In particular, the photodetector having the transimpedance amplifier circuit is suitable as a receiving device of a rangefinder according to the pulse transit time or phase measurement principle. The optical beams emitted in a distance measurement in the direction of a target and reflected there can now be received by the photodetector according to the invention in a broad frequency band and converted in an improved manner and without distortion into a measurable output voltage. Since, according to the invention, a measurement of beams modulated with a higher frequency is permitted, an exact distance measurement can be permitted.

The photodetector according to the invention may be both single-ended, as shown in the figures, and differential, for example a differential amplifier element having two feedback networks according to the invention being connected to both pins of a receiving element.

FIG. 3 shows a circuit arrangement which is in principle similar to that in FIG. 2. However, in the embodiment shown in FIG. 3, the photosensitive receiving element EE is connected in the third branch parallel to the resistance $R_3$, so that the self-capacitance $C_{EE}$ of the receiving element EE functions as a capacitance of the third branch. Particularly with the use of a large-area APD as a receiving element, for example having a diameter of >200 μm, this having a relatively high self-capacitance $C_{EE}$, this embodiment of the transimpedance amplifier according to the invention can be chosen.

The capacitance $C_3$ of the third branch, which is to be taken into account for the capacitive current division, is therefore composed of the self-capacitance $C_{EE}$ of the receiving element and of the parallel capacitance $C_{R3}$ of the resistance $R_3$ and in particular an additional capacitor connected parallel to the resistance $R_3$ and having the capacitance $C_{K3}$.

The receiving element EE shown by way of example in the figures by the standard symbol of a photodiode can, as is known to the person skilled in the art, also be inversely connected and may have all known designs suitable for this purpose.

Figure 4:
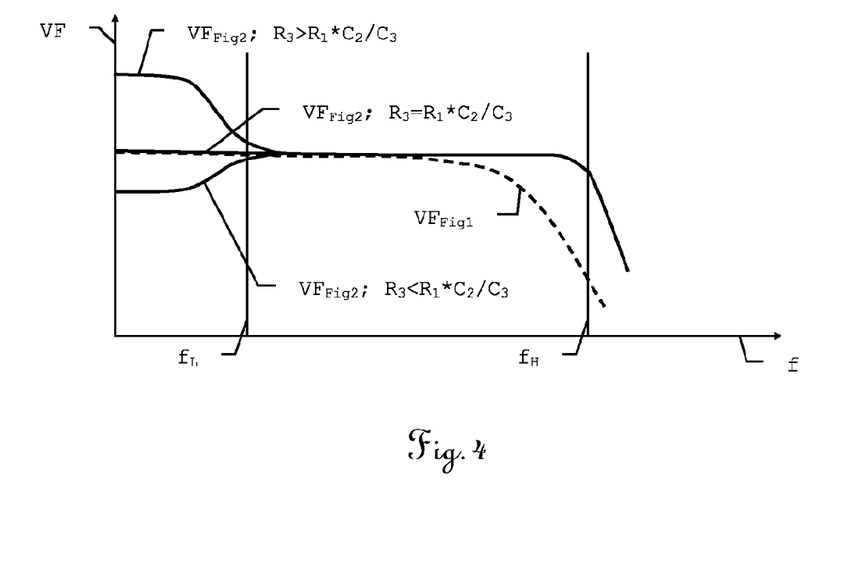
FIG. 4 shows an amplification factor-frequency diagram of a transimpedance amplifier circuit according to the invention.

FIG. 4 shows a diagram in which the application factor VF is plotted schematically as a function of the frequency f, the solid lines showing the amplification factors $VF_{Fig2}$ for a transimpedance amplifier circuit according to the invention as shown in FIG. 2 for variously chosen resistance $R_3$ and the dashed line showing the amplification factor $VF_{Fig1}$ of the circuit shown in FIG. 1 and known according to the prior art.

The transimpedance of the transimpedance amplifier circuit according to the invention in the alternative shown in FIG. 2 or 3 is also approximately constant for higher frequencies up to the frequency $f_H$. Thus, according to the invention, a higher bandwidth than in the case of the previously known circuit according to FIG. 1 can therefore be realized at comparable input noise.

Figure 5:
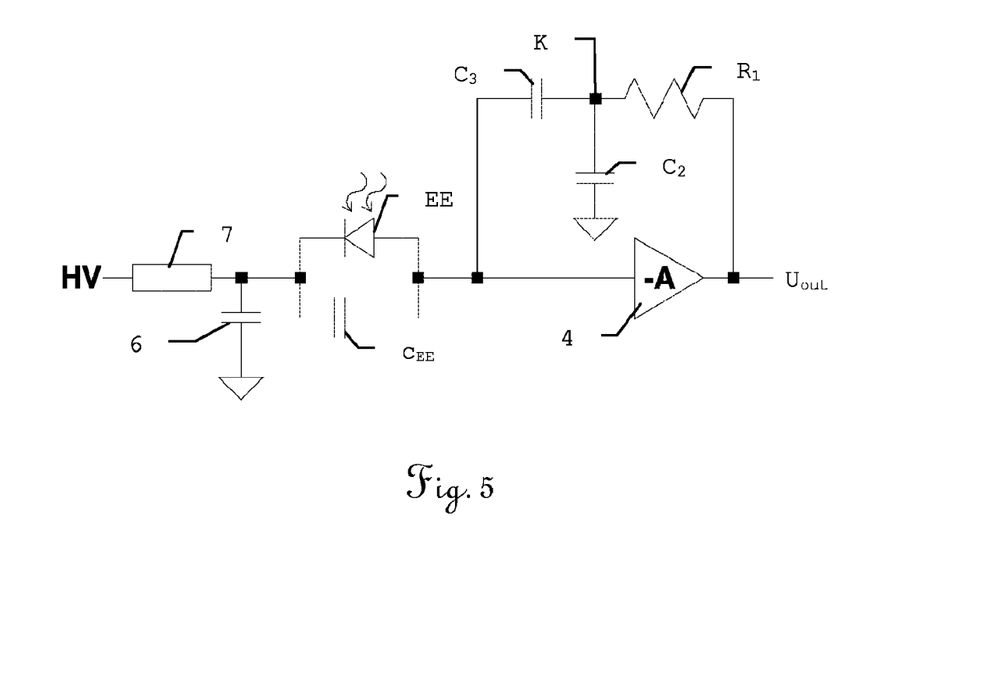
FIG. 5 shows a specific embodiment of the transimpedance amplifier circuit from FIG. 2.

In the working example in FIG. 5, the receiving element EE is in the form of an avalanche photodiode (APD) to which a high voltage HV is applied. A capacitor 6 short-circuits a pin of the APD with the amplifier ground in the relevant frequency range. An element 7 connects the positive or negative high voltage to the APD. This element should advantageously have a substantially higher impedance than the input impedance of the transimpedance amplifier in the frequency range of interest and can then be neglected for the transient processes. For example, a high-ohmic resistance or other elements known from the prior art and suitable for this purpose can be used therefor.

However, there are also further possibilities known to the person skilled in the art for connecting the receiving element to the transimpedance amplifier circuit.

In addition, FIG. 5 shows a specific form of the embodiment shown in FIG. 2, no resistance—or virtually a resistance having an infinitely high resistance value—now being arranged in the third branch of the feedback network. This specific embodiment illustrates the advantages achievable according to the invention, in particular the lower input current noise achievable thereby.

The second and the third branch have in each case exclusively a capacitor having the capacitance $C_2$ and $C_3$, respectively, and therefore having the impedance $Z_2=1/i\omega C_2$ and $Z_3=1/i\omega C_3$, respectively. The first branch is—as in the preceding working examples—designed with a relatively low resistance $R_1$, so that its bandwidth limited by its parallel capacitance $C_{R1}$ has a non-limiting effect.

Figure 7:
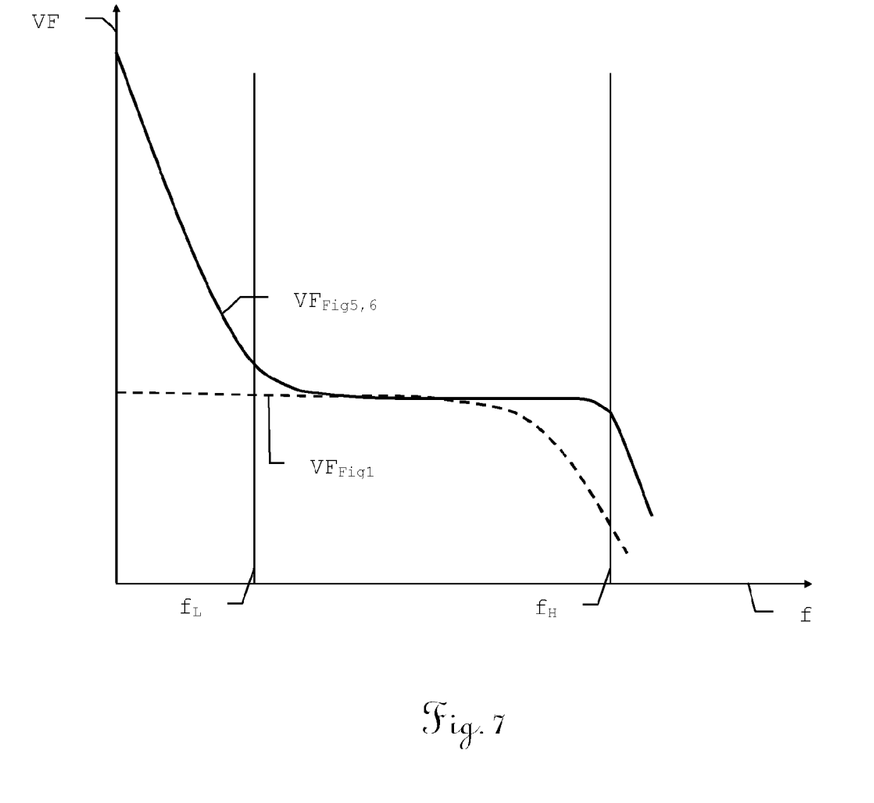
FIG. 7 shows an amplification factor-frequency diagram for a transimpedance amplifier circuit according to FIG. 5 or 6.

The transimpedance $Z_{EQ}$ is shown as a solid line as a function of the frequency in a diagram in FIG. 7. A region between a lower limiting frequency $f_L$, e.g. 10 MHz, and an upper limiting frequency $f_H$, e.g. 100 MHz, in which the transimpedance $Z_{EQ}$ is substantially constant is given by $$f_L = \frac{1}{2\pi \cdot R_1(C_3 + C_2)} \text{ and } f_H = \frac{1}{2\pi \cdot R_1 \cdot C_2 \left(\frac{C_{in}}{C_3} + \frac{C_{in}}{C_2} + 1\right)},$$

in which $C_{in}$, represents the input capacitance, which is given by the sum of $C_{EE}$ and the input capacitance of the amplifier element. A indicates the linear amplification factor of the amplifier element 4.

The real transimpedance $R_{EQ}$ in this range between $f_L$ and $f_H$ is approximately:

$$R_{EQ} = R_1 \left(\frac{C_3 + C_2}{C_3}\right) = R_1 \cdot G, \text{ where } G = \frac{C_3 + C_2}{C_3}.$$

The current through the first branch—which contains the current noise generated by the feedback resistance—is capacitively divided by this circuit arrangement, according to the invention, at node K in the ratio 1:G, so that an input current noise $I_{noise}$ is obtained as follows:

$$I_{noise} = \frac{\sqrt{\frac{4kT}{R_1}}}{G} = \sqrt{\frac{4kT}{R_1 \cdot G^2}} = \sqrt{\frac{4kT}{R_{EQ} \cdot G}}.$$

The greater G is defined by the capacitances $C_2$ and $C_3$, the lower is the input current noise $I_{noise}$.

According to the invention, a very low feedback resistance $R_1$ can now be chosen, so that its parasitic parallel capacitance $C_{R1}$ has a non-limiting effect for higher frequencies. In addition—for example for compensating an excessive increase in the amplification around $f_H$—a capacitor $C_{K1}$ can be connected parallel to the feedback resistance $R_1$ in order to adjust the amplification factor curve in a defined manner. The compensation capacitor $C_{K1}$ can, however, have a higher capacitance in comparison with compensation capacitors which are used in the case of circuits of the prior art, with the result that the circuit can be realized in a less complicated manner.

The disadvantage existing in the case of circuits of the prior art with the use of a low-ohmic feedback resistance $R_1$, that this gives rise to a correspondingly high input noise, can be over compensated by the capacitive current division at the node K, so that an input current noise $I_{noise}$ which is many times lower than in the case of the transimpedance amplifier shown in FIG. 1 at equivalent transimpedance can be realized.

However, the resulting compromise is that, for frequencies less than $f_L$, the transimpedance increases until the open-loop gain of the amplifier core is reached, and that—as already mentioned above—a higher current flows from the amplifier element into the feedback network than in the case of customary circuits known to date.

In order at least partly to compensate the increase in the amplification at low frequencies, for example, the amplifier core can be designed with a high-pass characteristic at low frequencies or, as already illustrated in FIGS. 2 and 3 and explained in the associated description, a resistance $R_3$ can be inserted in the third branch.

Since the total noise of the circuit is now dominated in particular by the noise of the amplifier core as a result of the reduction, achievable according to the invention, of the current noise generated by the feedback resistance, an HEMT can be chosen in particular as a first element of the amplifier core 4, since this produces very little noise.

The transimpedance amplifier can—as already shown in the above figures—be used in particular for photodetectors—these being used, for example, in the area of laser rangefinders. For this purpose, the photosensitive receiving element EE is connected to the amplifier element 4, so that the input current generated by this receiving element EE as a function of its illumination is fed to the signal input of amplifier element 4. The transimpedance amplifier circuit shown converts the generated input current into a measurable output voltage in an approximately linear manner and with little noise, even for high frequencies.

Figure 6:
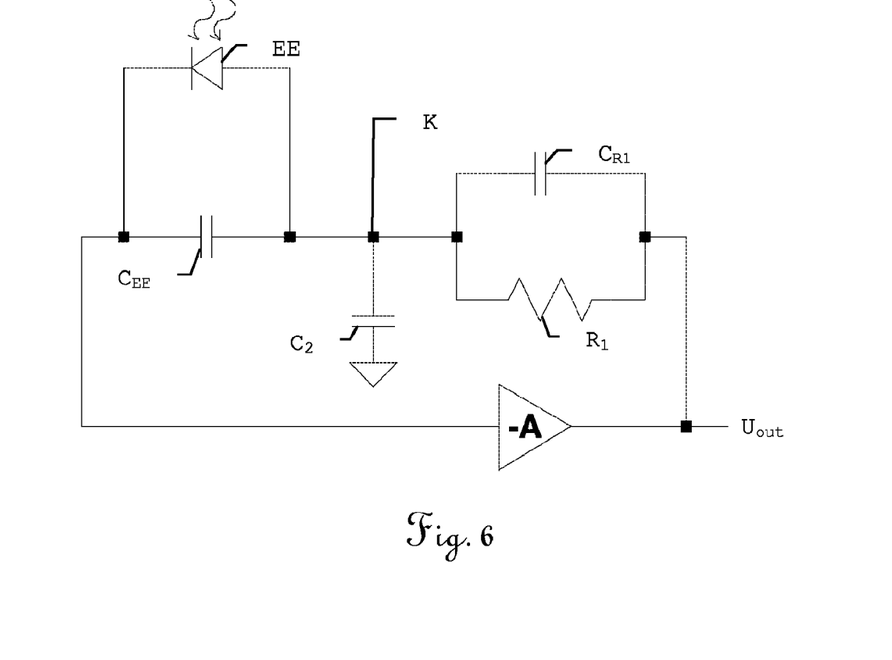
FIG. 6 shows a specific embodiment of the transimpedance amplifier circuit from FIG. 3.

FIG. 6 shows a further embodiment of the transimpedance amplifier circuit according to the invention, where—in contrast to FIG. 5—the receiving element is inserted—similarly to the embodiment shown in FIG. 3—in the third branch of the feedback network, and the real transimpedance $R_{EQ}$ in the frequency range between $f_L$ and $f_H$ is approximately:

$$R_{EQ} = R_1 \frac{C_2}{C_3} = R_1 \cdot G, \text{ where } G = \frac{C_2}{C_3},$$

in which $$f_L = \frac{1}{2\pi \cdot R1 \cdot C2} \text{ and } f_H = \frac{A}{2\pi \cdot R1 \cdot C2} = A \cdot f_L.$$

The second branch has exclusively a capacitor having the capacitance $C_2$ and the third branch has the receiving element having the parallel capacitance $C_{EE}$.

It is possible for the third branch to have exclusively the receiving element EE and hence for the parallel capacitance $C_{EE}$ to represent solely the capacitance $C_3$ of the third branch. In particular, however, a capacitor having the capacitance $C_{K3}$ can be connected parallel to the receiving element EE, in addition to the parallel capacitance $C_{EE}$ of the receiving element EE, so that a capacitance $C_3 = C_{EE} + C_{K3}$ results in the third branch.

If, for example, a pin diode or CMOS sensors is or are used as receiving element EE, it is not necessary to apply a high voltage to this.

In the alternative shown in FIGS. 5 and 6 without a resistance in the third branch of the feedback network, for example, a bias current for the receiving element can be fed through an external element. In the case of a discrete design, however, it is also possible to use the bias network of the input transistor of the amplifier core directly for this purpose.

The circuit arrangements from FIGS. 3 and 6 have the advantage that the capacitance seen by the amplifier input can be smaller than in the case of the circuit arrangements from FIGS. 2 and 5. This is important particularly in the case of fast transimpedance amplifiers, since the noise which is caused by the input voltage noise of the amplifier element increases proportionally to the input capacitance at high frequencies.

The input capacitance can be further reduced if amplifier core and the photoelement are present on the same die. For example, chip technologies can be mixed by connecting different dies in the same housing by bonding and thus keeping the capacitances small. It is also known that pin diode and amplifier can be combined on a standard CMOS process or a photoelement can be "bonded" together with an amplifier core based on low-noise technology. If phototransistors are used as photoelements, the noise of the amplifier can be additionally reduced in a known manner.

FIG. 7 shows a diagram in which the amplification factor VF determined by the transimpedance is plotted as a function of the frequency, the solid line showing the amplification factor $VF_{Fig5,6}$ for a transimpedance amplifier circuit according to the invention as shown in FIG. 5 or 6 and the dashed line showing the amplification factor $VF_{Fig1}$ of the circuit shown in FIG. 1, known according to the prior art and having a higher input noise.

The transimpedance of the transimpedance amplifier circuit according to the invention in the embodiment shown in FIGS. 5 and 6 is also approximately constant for higher frequencies up to frequency $f_H$. However, the transimpedance increases for frequencies $f<f_L$ until the open-loop amplification of the amplifier core is reached. Particularly with the use of the transimpedance amplifier in a photodetector for a laser rangefinder, the frequency range in which the amplification is approximately constant covers the frequency range relevant for rangefinders, so that the increase in the transimpedance results in no disadvantages for lower frequencies. Thus, a more accurate distance measurement can be realized by the low current noise permitted according to the invention and the permitted use of higher frequencies.

Figure 8:
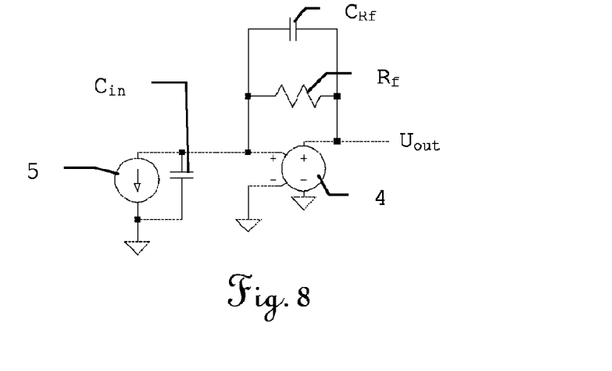
FIG. 8 shows a simulation setup of a transimpedance amplifier circuit known according to the prior art.
Figure 9:
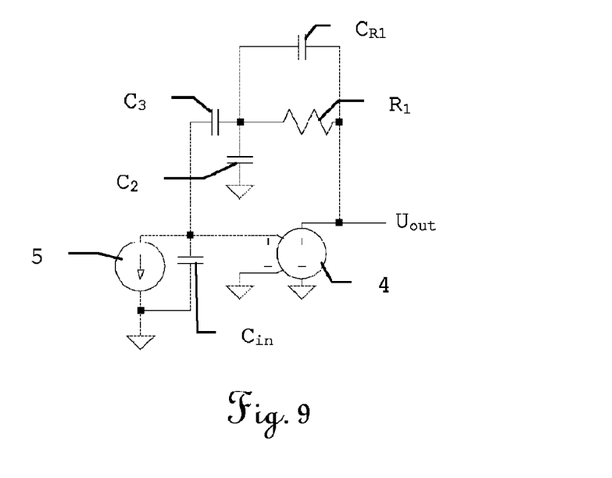
FIG. 9 shows a simulation setup of a transimpedance amplifier circuit according to the invention.

FIGS. 8 and 9 show, purely by way of example, simulation circuits having discrete values for the individual components used in the simulation. FIG. 8 shows a transimpedance amplifier circuit of the prior art and FIG. 9 shows the transimpedance amplifier circuit similar to the embodiment according to the invention shown in FIG. 5. The amplification factors VF which result in the case of the simulation of the circuits shown and which are determined by the respective transimpedances, and the current noise resulting in each case, are shown in a diagram in FIG. 10 as a function of the frequency f.

In each case an ideal alternating current source having a generated current of $I_{in}=1$ μA is assumed as current source 5, a capacitance of $C_{in}=2$ pF being assumed parallel to this current source 5 for the simulation of the parallel capacitance of a photosensitive receiving element. In each case an ideal voltage amplifier having an amplification of −300 is arranged as amplifier element 4.

A feedback resistance $I_f=30$ kΩ with the parasitic parallel capacitance $C_{Rf}=0.1$ pF is arranged in the circuit in FIG. 8, a transimpedance of $Z_{EQ,Fig8}=R_f=30$ kΩ therefore resulting approximately in the relevant frequency range.

On the other hand, the circuit according to the invention in FIG. 9 has a T-shaped feedback network with the resistance $R_1=300$Ω with the parallel capacitance $C_{R1}=0.1$ pF and the capacitance $C_2=198$ pF and the capacitance $C_3=2$ pF, so that, as in the case of transimpedance $Z_{EQ}$, the following is approximately true in a relevant frequency range:

$$Z_{EQ,Fig\,9} = R_1\left(\frac{C_3 + C_2}{C_3}\right) = R_1 \cdot G = 300 \text{ }\Omega \cdot 100 = 30 \text{ k}\Omega.$$

Figure 10:
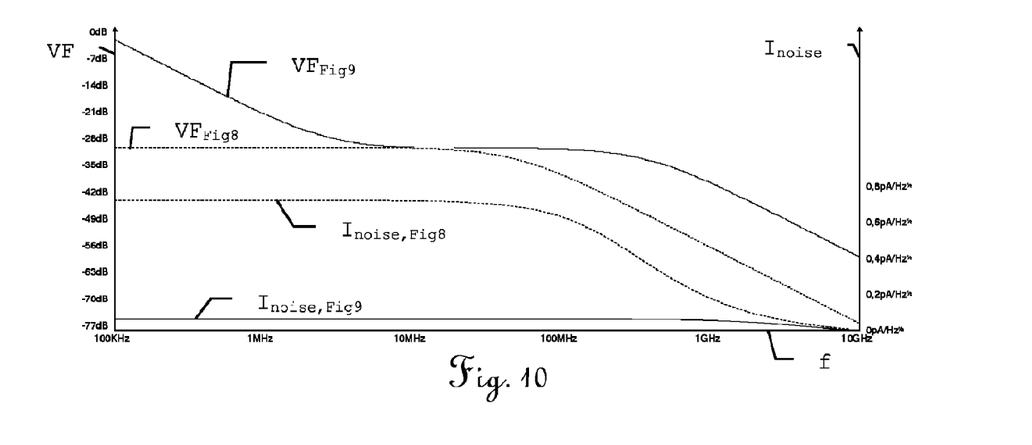
FIG. 10 shows an amplification factor-frequency diagram for the simulation circuits from FIGS. 8 and 9.

FIG. 10 shows in each case the amplification VF determined by the transimpedance $Z_{EQ}$ and the current noise $I_{noise}$ for the circuits of FIGS. 8 and 9 as a function of the frequency f.

As already explained, it is possible according to the invention to prolong, for higher frequencies, a drop in the amplification factor $VF_{Fig9}$ determined by the transimpedance $Z_{EQ,Fig9}$, whereas the amplification factor $VF_{Fig9}$ increases for lower frequencies. In a frequency range relevant for many applications, this is constant and is approximately equal to the amplification factor $VF_{Fig8}$ of the circuit from FIG. 8.

Furthermore, the diagram shows that, in the relevant frequency range, the current noise $I_{noise,Fig9}$~0.07 pA of the circuit from FIG. 9, caused by the feedback resistance, can be reduced by the factor $1/\text{root}(G)=1/\text{root}(100)=1/10$ by means of the capacitive current division according to the invention, compared with the current noise $I_{noise,Fig8}≈0.7$ pA, which results in the case of the circuit from FIG. 8.

The current noise $I_{noise,Fig9}$ is, for example, so low that it is negligible in relation to other noise sources of a real transimpedance amplifier, such as, for example, a voltage noise of the amplifier element.

Figure 11:
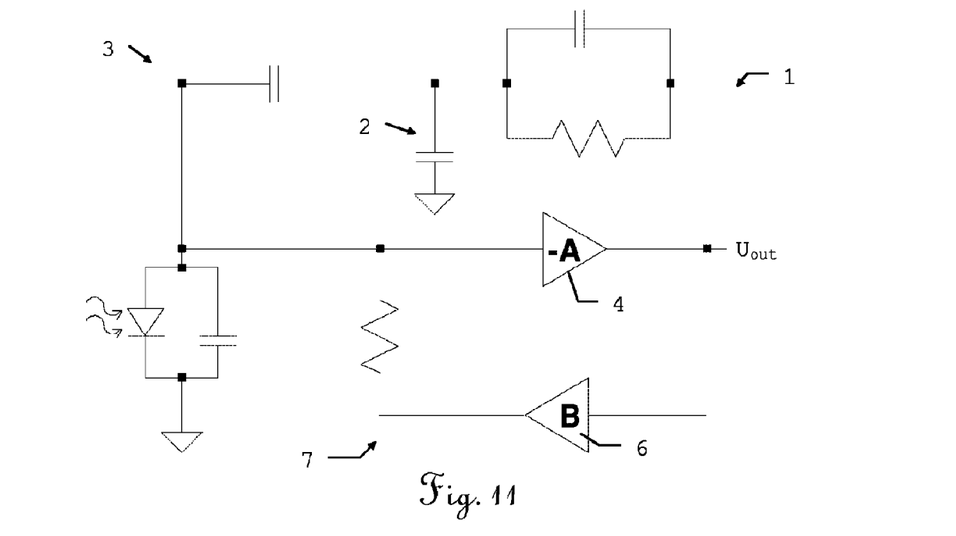
FIG. 11 shows a further embodiment, according to the invention, of the transimpedance amplifier circuit with a second feedback branch.

FIG. 11 shows a further embodiment for a transimpedance amplifier circuit according to the invention.

There, a second feedback path 7 with a second amplifier element 6 is now provided parallel to the T-shaped feedback network—with the first branch 1, the second branch 2 and the third branch 3. Purely by way of example, an operational amplifier can be used as the second amplifier element 6.

As a result of the arrangement of the second, active feedback path 7, the increase—shown in the diagram in FIG. 7—of the transimpedance can be prevented at low frequencies below $f_L$. The second amplifier element amplifies the output $U_{out}$ at low frequencies by the amplification factor B of this second amplifier element 6. From the output of the amplifier element 6, the signal can now be fed back to the input of the transimpedance amplifier, specifically with a resistance higher by the factor B than the required transimpedance. This second feedback path 7 can advantageously be designed with an upper limiting frequency which corresponds to the lower limiting frequency of the T-shaped feedback network.

Figure 12:
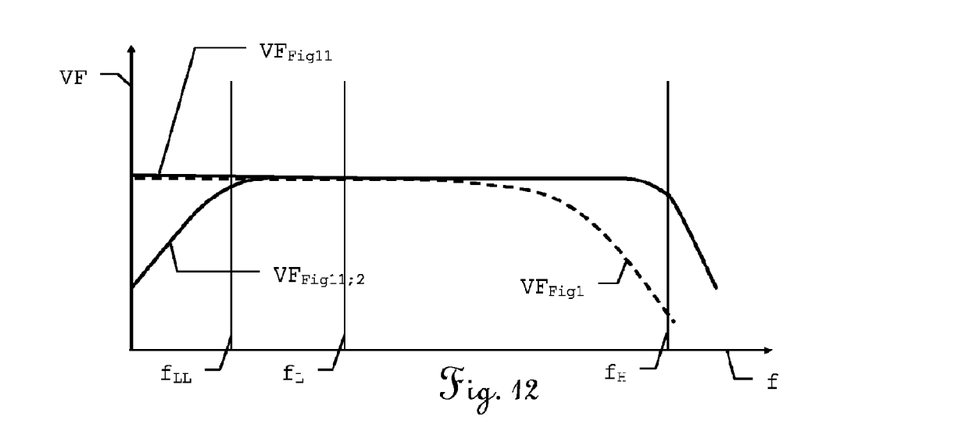
FIG. 12 shows an amplification factor-frequency diagram for a transimpedance amplifier circuit according to FIG. 11.
Figure 13:
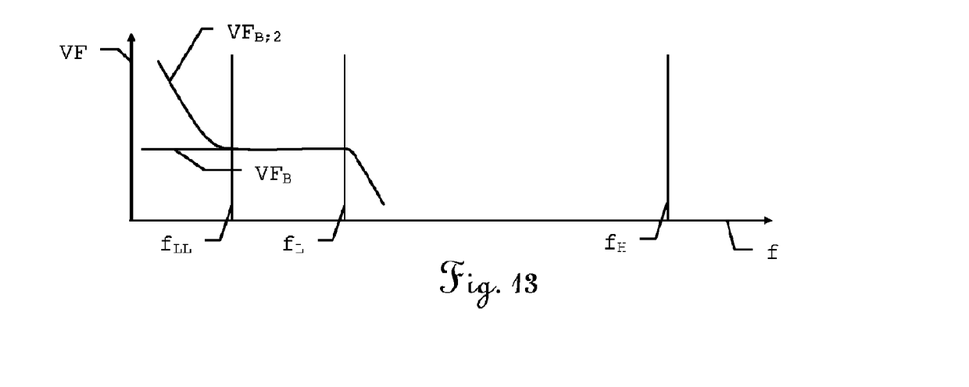
FIG. 13 shows an amplification factor-frequency diagram for the second amplifier element from FIG. 11.

For example, the second amplifier element 6 can be configured so that the amplification factor B has the frequency response of the amplification factor $VF_B$, shown in FIG. 13. As illustrated in the diagram in FIG. 12, the increase in the amplification factor $VF_{Fig11}$ of the total transimpedance amplifier can thus be prevented for frequencies below the frequency $f_L$.

Alternatively, the second, active feedback path 7 can also be designed in such a way that the transimpedance amplifier performs a bandpass function. Consequently, for example, it is possible to ensure that the DC current cannot be seen at the output of the transimpedance amplifier since such frequencies are filtered out. For this purpose, the additional, second amplifier element 6 can be designed in particular so that the amplification factor B has the second frequency response $VF_{B;2}$ shown in FIG. 13. For frequencies below the frequency $f_{LL}$, the amplification factor $VF_{B;2}$ of the second feedback path increases so that the amplification factor $VF_{Fig11;2}$ of the total transimpedance amplifier—as shown in FIG. 12—decreases below the frequency $f_{LL}$ and hence the bandpass function is provided.

For comparison purposes, the application factor $VF_{Fig1}$ for the transimpedance amplifier known according to the prior art and shown in FIG. 1 and having a higher input noise is also shown—as a dashed line—in FIG. 12.

Of course, these figures shown represent only examples of possible embodiments. To ensure clearer presentation of the elements according to the invention, a presentation of further components customary in the field is dispensed with, in particular in the case of the small-signal equivalent circuits shown. For example, DC operating point adjustments can additionally be carried out or, in a practical realization, the node K can be separated from $U_{out}$ by a decoupling capacitor, and the bias voltage for the photoelement can be adjusted at the point K and at the input of the amplifier element.

I claim:

1. A transimpedance amplifier circuit for converting an input current into an output voltage $U_{out}$, comprising:
    an amplifier element having at least one signal input and an output having the output voltage $U_{out}$; and
    a T-shaped feedback network which is divided into at least one first branch, a second branch and a third branch connected in series with the first branch, so that a node results, the first branch having an ohmic resistance $R_1$ and being connected at one end to the output and at the other end to the node, wherein:
        the second branch has at least one capacitance $C_2$ and is connected at one end to the node; and
        the third branch has at least one capacitance $C_3$ and is connected at one end to the node and at the other end to the signal input, so that a capacitive current division takes place at the node.

2. A transimpedance amplifier circuit according to claim 1, wherein the second branch is connected at the other end to a ground.

3. A transimpedance amplifier circuit according to claim 1, wherein the second branch has exclusively capacitances.

4. A transimpedance amplifier circuit according to claim 1, wherein the second branch has exclusively a capacitor as capacitance $C_2$.

5. A transimpedance amplifier circuit according to claim 1, wherein the third branch has exclusively capacitances.

6. A transimpedance amplifier circuit according to claim 1, wherein the third branch has exclusively a capacitor as capacitance $C_3$.

7. A transimpedance amplifier circuit according to claim 1, wherein:
    a transimpedance $R_{EQ}$ defined by the transimpedance amplifier circuit for alternating current frequencies in a range between a lower limiting frequency $f_L$ and an upper limiting frequency fn is substantially constant; and
    the following is true for a current noise $I_{noise}$ defined by the transimpedance amplifier circuit: $I_{noise} < \text{root}(4kT/R_{EQ})$, where:
    k—is the Boltzmann constant (1,3806488×10-23 Joule/Kelvin);
    T—is the Temperature (in degrees Kelvin); and
    root—is the mathematical square-root ($\sqrt{}$).

8. A transimpedance amplifier circuit according to claim 1, wherein the third branch has an ohmic resistance $R_3$.

9. A transimpedance amplifier circuit according to claim 1, wherein the amplifier element has a high electron mobility transistor as an input transistor.

10. A transimpedance amplifier circuit according to claim 1, wherein the amplifier element is in the form of an operational amplifier including:
    an operational amplifier signal input as a signal input;
    an operational amplifier reference input; and
    an operational amplifier output as an output.

11. A transimpedance amplifier circuit according to claim 1, wherein the transimpedance amplifier circuit is formed at least partly as an integrated circuit arrangement.

12. A transimpedance amplifier circuit according to claim 1, wherein the transimpedance amplifier circuit is discrete.

13. A transimpedance amplifier circuit according to claim 1, wherein a second feedback path having a second amplifier element is connected parallel to the T-shaped feedback network.

14. A transimpedance amplifier circuit according to claim 1, wherein a second feedback path having a second amplifier element is connected parallel to the T-shaped feedback network, the upper limiting frequency of the second feedback path corresponding to the lower limiting frequency of the T-shaped feedback network.

15. A photodetector for distance-measuring electronics, comprising:
    a photosensitive receiving element for generating an input current dependent on the illumination of said receiving element
    a transimpedance amplifier circuit according to claim 1 for converting the input current into a measurable output voltage, the receiving element being connected to the signal input.

16. A transimpedance amplifier circuit according to claim 8, wherein the third branch additionally has a capacitor connected parallel to the ohmic resistance $R_3$.

17. A transimpedance amplifier circuit according to claim 8, wherein a transimpedance $R_{EQ}$ defined by the transimpedance amplifier circuit for alternating current frequencies in a range up to an upper limiting frequency $F_H$ is substantially constant.

18. A transimpedance amplifier circuit according to claim 10, wherein the operational amplifier reference input is connected to a ground.

19. A photodetector according to claim 15, wherein the photodetector is a photodiode, a pin diode, an avalanche photodiode, a phototransistor or CMOS.

20. A photodetector according to claim 15, wherein the receiving element is connected parallel to the capacitance C3 in the third branch or the parallel capacitance of the receiving element itself represents the capacitance C3.

21. A photodetector according to claim 15, wherein the receiving element and the transimpedance amplifier circuit are based at least partly on a common chip.

22. A photodetector according to any of claims 15, wherein the receiving element and the transimpedance amplifier circuit are arranged at least partly in a common housing and are connected by bonding.

* * * * *